United States Patent [19]

Diaz

[11] 4,402,930

[45] Sep. 6, 1983

[54] SULFUR RECOVERY PROCESS

[75] Inventor: Zaida Diaz, Houston, Tex.

[73] Assignee: Shell Oil Company, Houston, Tex.

[21] Appl. No.: 353,559

[22] Filed: Mar. 1, 1982

Related U.S. Application Data

[63] Continuation-in-part of Ser. No. 267,201, May 26, 1981.

[51] Int. Cl.$^3$ .................. C01B 17/04; B01D 53/34
[52] U.S. Cl. .................. 423/573 G; 423/224; 423/226; 423/578 R
[58] Field of Search .............. 423/224, 226, 573, 575, 423/222, 578 R

[56] References Cited

U.S. PATENT DOCUMENTS

| | | | |
|---|---|---|---|
| 3,068,065 | 12/1962 | Hartley et al. | 423/228 |
| 3,099,536 | 7/1963 | Arban et al. | 423/575 |
| 3,580,950 | 5/1971 | Bersworth | 562/565 |
| 3,933,993 | 1/1976 | Salemme | 423/226 |
| 4,009,251 | 2/1977 | Meuly | 423/573 |
| 4,091,073 | 5/1978 | Winkler | 423/226 |

FOREIGN PATENT DOCUMENTS 999799  7/1965  United Kingdom ............... 423/573

*Primary Examiner*—Earl C. Thomas
*Attorney, Agent, or Firm*—Albert J. Adamcik

[57] ABSTRACT

A cyclic process for the removal of hydrogen sulfide, and carbon dioxide, from a variety of gas streams is disclosed. The gas stream containing the sour gas is contacted with reactant solution containing specified reactant materials and a minor amount of a monoalcohol ($C_nH_{2n+1}OH$, where n is 4 through 18) crystal modifier. The hydrogen sulfide is converted to sulfur, $CO_2$ is absorbed to produce a purified gas stream, the reactant material is reduced, and good quality sulfur is produced. The process includes removal of the sulfur and regeneration of the reactant.

39 Claims, No Drawings

SULFUR RECOVERY PROCESS

BACKGROUND OF THE INVENTION

This application is a continuation-in-part of my pending application Ser. No. 267,201, entitled Sulfur Recovery Process, filed May 26, 1981.

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

A problem associated with such processes is that the solid sulfur produced is of poor quality, i.e., it is very finely divided and difficult to separate from the aqueous reactant solution. A process which provided for the efficient reaction of $H_2S$ and removal of the sulfur produced could have great economic importance.

SUMMARY OF THE INVENTION

Accordingly, the invention relates to a process for the removal of $H_2S$ from a sour gaseous stream comprising contacting the sour gaseous stream comprising contacting the sour gaseous stream in a contacting zone with an aqueous reactant mixture, the aqueous reactant mixture comprising an effective amount of an oxidizing reactant selected from the group consisting of polyvalent metal ions, polyvalent metal chelate compounds, and mixtures thereof, and a modifying amount of a composition selected from compounds having the formula $C_nH_{2n+1}OH$, wherein n is a whole number from 4 through 18, and mixtures thereof. A sweet gas stream is produced, and an aqueous admixture containing sulfur and a reduced reactant is removed from the contact zone. The invention provides that at least a portion of the sulfur crystals may be removed before regenerating the reactant, or at least a portion of the sulfur crystals may be removed after regeneration. The sulfur crystals obtained, due to the presence of the modifier compound, are of improved quality, i.e., they have increased size, and, thus, improved filterability. The reduced polyvalent metal ions, chelate, etc. are regenerated by contacting the mixture in a regeneration zone or zones with oxygen. As used herein, the term "oxygen" includes oxygen-containing gases such as air or air-enriched with oxygen. The oxygen oxidizes the reduced metal ions or the metal of the chelate or chelates to a higher valence state, and the regenerated mixture is returned to the contact zone.

In another embodiment of the invention, a sour gaseous stream containing $H_2S$ and $CO_2$ is contacted with a selective absorbent-aqueous reactant mixture, the reactant mixture and procedure being similar to that described, supra. Broadly, this is accomplished by the use of an absorbent mixture containing a selective liquid absorbent for $CO_2$ (and preferably for $H_2S$, as well), an effective amount of a polyvalent metal, polyvalent metal chelate compound, and mixtures thereof, and a modifying amount of the modifiers described. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal, chelate, etc. In the process, the reactant is reduced, and the sulfur may be treated, as described, supra. As in the previous embodiment, the sulfur crystals may be removed prior or subsequent to a regeneration of the admixture, and the crystals produced are of increased size. Preferably, if the volume of $CO_2$ absorbed is large, the reactant-containing solution is stripped, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone.

As indicated, supra, the invention also provides in this embodiment for the regeneration of the reactant and the absorbent. Specifically, the loaded absorbent mixture and the reduced polyvalent metal ions, polyvalent metal chelate, or mixtures thereof, are regenerated by contacting the mixture in a regeneration zone or zones with oxygen. The oxygen accomplishes two functions, the stripping of any $CO_2$ from the loaded absorbent mixture, and the oxidation of the reduced reactant to a higher oxidation state. The oxygen (in whatever form supplied) is supplied in a stoichiometric equivalent or excess with respect to the amount of reactant present in the mixture. Preferably, the oxygen is supplied in an amount of from about 1.2 to 3 times excess.

The particular type of gaseous stream treated is not critical, as will be evident to those skilled in the art. Streams particularly suited to removal of $H_2S$ and $CO_2$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, and other gaseous hydrocarbon streams. The term "hydrocarbon stream(s)", is employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, and may range from about 0.5 percent to over 99 percent by volume. Obviously, the amounts of $H_2S$ and $CO_2$ present are not generally a limiting factor in the practice of the invention.

The temperatures employed in the contacting or absorption-contact zone are not generally critical, except that the reaction is carried out at a temperature below the melting point of sulfur. In many commercial applications, such as the removal of H₂S and CO₂ from natural gas to meet pipeline specifications, contacting at ambient temperatures is desired, since the cost of refrigeration would exceed the benefits obtained due to increased absorption at the lower temperature. In general, temperatures of from 10° C. to 80° C. are suitable, and temperatures from 20° C. to 45° C. are preferred. Contact times may range from about 1 second to about 270 seconds or longer, with contact times of 2 seconds to 120 seconds being preferred.

Similarly, in the regeneration or stripping zone or zones, temperatures may be varied widely. Preferably, the regeneration zone should be maintained at substantially the same temperature as the absorption zone. If heat is added to assits regeneration, cooling of the absorbent mixture is required before return of the absorbent mixture to the absorption zone. In general, temperatures of from about 10° C. to 80° C., preferably 20° C. to 45° C. may be employed.

Pressure conditions in the absorption zone may vary widely, depending on the pressure of the gas to be treated. For example, pressures in the absorption zone may vary from one atmosphere up to one hundred fifty or even two hundred atmospheres. Pressures of from one atmosphere to about one hundred atmospheres are preferred. In the regeneration or desorption zone or zones, pressures may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, Great Britain patent specification no. 999,799 to Nichol et al, published July 28, 1965, and U.S. Pat. No. 4,009,251 to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.4.

As indicated, the H₂S, when contacted, is quickly converted by the oxidizing polyvalent metal ions, polyvalent metal chelate, etc. to elemental sulfur. Since many polyvalent metal compounds and metal chelates have limited solubility in many solvents or absorbents, the polyvalent metal compounds or chelates are preferably supplied in admixture with the liquid absorbent and water. The amount of polyvalent metal compound, polyvalent metal chelate, or mixtures thereof, supplied is an effective amount, i.e., an amount sufficient to convert all or substantially all of the H₂S in the gas stream, and will generally be on the order of at least about one mol per mol of H₂D. Ratios of from about 1 or 2 mols to about 15 mols of polyvalent metal compound or chelate per mol of H₂S may be used, with ratios of from about 2 mols per mol to about 5 mols of polyvalent metal compound or chelate per mol of H₂S being preferred. The manner of preparing the admixture containing an absorbent is a matter of choice. For example, the compound or chelate may be added to the absorbent, and, if necessary, then water added. The amount of water added will normally be just that amount necessary to achieve solution of the polyvalent metal compound or chelate, and can be determined by routine experimentation. Since the polyvalent metal compound or chelate may have a significant solubility in the solvent, and since water is produced by the reaction of the H₂S and the ions or chelate, precise amounts of water to be added cannot be given. In the case of absorbents having a low solubility for the polyvalent metal compound or chelate, approximately 5 percent to 10 percent water by volume, based on the total volume of the absorbent mixture, will generally provide solvency. Preferably, however, the polyvalent ions or chelate are added as an aqueous solution to the liquid absorbent. Where they are supplied as an aqueous solution, the amount of solution supplied may be about 20 percent to about 80 percent by volume of the total absorbent admixture supplied to the absorption zone. A polyvalent metal chelate solution will generally be supplied as an aqueous solution having a concentration of from about 0.1 molar to about 2 or 3 molar, and a concentration of about 1.0 molar is preferred.

Any oxidizing polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

Preferred reactant materials are coordination complexes in which polyvalent metals form chelates with an acid having the formula

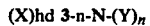

wherein n is a whole number from 1 to 3; Y is an acetic acid or propionic acid group; X is 2-hydroxy ethyl, 2-hydroxy propyl, or an alkyl group having from one to four carbon atoms; or

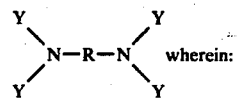

wherein
from two to four of the groups Y are selected from acetic and propionic acid groups;
from zero to two of the groups Y are selected from 2-hydroxy ethyl and 2-hydroxy propyl; and
R is ethylene, propylene or isopropylene or alternatively cyclohexane or benzene where the two hydrogen atoms replaced by nitrogen are in the 1,2 position; and mixtures thereof.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The iron chelates of NTA and 2-hydroxyethyl ethylene diamine triacetic acid are preferred.

The absorbents employed in this invention are those absorbents which have a high degree of selectivity in absorbing $CO_2$ (and preferably $H_2S$ as well) from the gaseous streams. Any of the known liquid absorbents conventionally used which do not affect the activity of the polyvalent metal ions, polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol monoethylether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

As indicated, compounds having the formula $C_nH_{2n+1}OH$, in which n is a whole number from 4 through 18, and mixtures thereof, may be used in improving the size or quality of the sulfur particles produced. Preferably, the compounds employed are those wherein n is a whole number from 4 through 12. Particularly preferred compounds are t-butanol, n-pentanol, n-octanol, n-decanol, n-undecanol, n-dodecanol, and mixtures thereof. The compound or compounds are supplied in the reactant mixture in an effective or modifying amount, i.e, an amount sufficient to improve the quality of the sulfur produced. This amount will clearly be a minor amount, i.e., less than about 6 percent by weight, based on the weight of the aqueous reactant mixture or the $CO_2$-selective absorbent mixture, and normally will not be an amount which exceeds substantially the solubility of the given modifying compound in the aqueous reaction mixture or the $CO_2$-selective absorbent mixture. In general, those skilled in the art may adjust the amount of modifier added to produce optimum results, good results being obtained, in the case of aqueous mixtures, when the modifier is present in an amount of from about 0.01 percent by weight, based on the weight of the aqueous reactant mixture, to an amount which is at or near the saturation level of the modifier in the reaction solution without forming a significant second layer or phase. Accordingly, the amount employed will normally range (depending on the alcohol) from about 0.01 percent to about 4 percent (by weight, based on the weight of the aqueous reactant mixture or the $CO_2$-selective absorbent mixture) or slightly greater. The precise amount employed may be determined by experimentation, it being generally observed that the higher the molecular weight of the alcohol employed, the lower the concentration required to improve sulfur quality. The manner of recovering the sulfur is a matter of choice. For example, the crystals may be recovered by settling, filtration, liquid flotation, or by suitable devices such as hydroclone, etc.

DETAILED DESCRIPTION OF THE INVENTION

In order to illustrate the invention in greater detail, the following examples are provided. The values given herein relating to temperatures, pressures, compositions, etc., should be considered namely exemplary and not as delimiting the invention. Examples III and V are theoretical.

EXAMPLE I $H_2S$ enters a contact vessel into which also enters an aqueous mixture containing 8.8 percent by weight (based on the total weight of the mixture) of the Fe (III) chelate of nitrilotriacetic acid. The pressure of the feed gas is about 0 psig, and the temperature of the mixture is about 35° C. A contact time of about 100 seconds is employed. In the mixture, the $H_2S$ is converted to elemental sulfur by the Fe (III) chelate, Fe (III) chelate in the process being converted to the Fe (II) chelate. The sulfur produced is very fine and difficult to separate from solution.

EXAMPLE II

A procedure similar to Example I is followed, except that 0.05 percent by weight (based on the total weight of the mixture) of decyl alcohol is added to the reactant solution. The sulfur crystals are larger than those of Example I, the average particle size being approximately an order of magnitude larger in diameter.

EXAMPLE III

Sour gas, e.g., natural gas containing about 10 percent $H_2S$ and 25 percent by volume $CO_2$, enters an absorption vessel which contains an absorbent mixture composed of about 81 percent sulfolane by weight (based on the total weight of the mixture), about 17 percent by weight of an aqueous 0.5 M solution of the Fe (III) chelate of n-hydroxyethyl ethylene diamine triacetic acid and about 1.7%w dodecanol. The pressure of the feed gas is about 30 psig, and the temperature of the absorbent mixture is about 35° C. A contact time of about 180 seconds is employed in order to absorb virtually all $CO_2$ and react all the $H_2S$. Purified or "sweet" gas is removed, the "sweet" gas being of a purity sufficient to meet standard requirements. In the absorbent mixture, the $H_2S$ is converted to elemental sulfur by the Fe (III) chelate, Fe (III) chelate in the process being converted to the Fe (II) chelate. The absorbent mixture, containing the elemental sulfur, absorbed $CO_2$ and the Fe (II) chelate, is removed continuously and may be stripped to regenerate the chelate and recover $CO_2$.

EXAMPLE IV

A series of runs were made using a procedure similar to Example I to determine the effect of modifiers coming within the scope of the invention. The results are shown in the Table.

EXAMPLE V

Sour gas, e.g., natural gas containing about 8.0 percent $H_2S$ and 15 percent by volume $CO_2$, enters an absorption vessel which contains an absorbent mixture composed of 81 percent carbitol (diethylene glycol monoethyl ether) by weight (based on the total weight of the mixture), seventeen percent of an aqueous 0.8 M solution of the Fe (III) chelate of nitrilotriacetic acid and 2.0%w dodecanol. The pressure of the feed gas is about 75 psig, and the temperature of the absorbent mixture is about 35° C. A contact time of about 180 seconds is employed in order to absorb virtually all $CO_2$ and react all the $H_2S$. Purified or "sweet" gas is removed, the "sweet" gas being of a purity sufficient to meet standard requirements. In the absorbent mixture, the $H_2S$ is converted to elemental sulfur by the Fe (III) chelate, Fe (III) chelate in the process being converted to the Fe (II) chelate. The absorbent mixture, containing the elemental sulfur, absorbed $CO_2$ and the Fe (II) chelate, is removed continuously and may be stripped to regenerate the chelate and recover $CO_2$.

TABLE

Effect of Modifiers on Sulfur Crystal Size of Reaction Solution at 60° C.

| Solution Composition | | | | |
|---|---|---|---|---|
| % w Fe | % m excess HOEEDTA | pH | Modifier | S° mean vol. diameter($\mu$)[a] |
| | (n-hydroxyethyl-ethylenediaminetri-acetic acid) | | | |
| 8 | 10 | 4.5 | none[b] | 1.9 |
| 8 | 10 | 4.5 | Dodecanol (500 ppm) | 6.9 |
| 8 | 10 | 4.5 | Decanol (500 ppm) | 17.1 |
| 8 | 10 | 4.5 | none[d] | 5.2 |
| 8 | 10 | 4.5 | Decanol (500 ppm) | 13.7 |
| 8 | 10 | 4.5 | Decanol (5% w) | 23.8 |
| 8 | 10 | 4.5 | Neodol 91 (500 ppm)[c] | 12.3 |
| 8 | 10 | 4.5 | Neodol 91 (5% w) | 20.3 |
| 4 | 20 | 8 | none | 4.4 |
| 4 | 20 | 8 | Decanol (30 ppm) | 4.8 |
| 4 | 20 | 8 | Decanol (300 ppm) | 8.8 |
| 4 | 20 | 8 | Neodol 91 (30 ppm) | 4.9 |
| 4 | 20 | 8 | Neodol 91 (300 ppm) | 8.9 |

[a]Determined by Coulter Counter.
[b & d]Two different batches of the same solution recipe.
[c]Mixture of alcohols $C_9$-$C_{11}$.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which may be beneficial.

What is claimed is:

1. A process for the removal of $H_2S$ from a sour gaseous stream comprising:
   (a) contacting the sour gaseous stream in a contacting zone with an aqueous reactant mixture at a temperature below the melting point of sulfur, the mixture comprising an effective amount of an oxidizing polyvalent metal chelate compound and less than 6 percent by weight, based on the weight of the aqueous reactant mixture, of a modifier selected from compounds having the formula $C_nH_{2n+1}OH$, wherein n is a number from 4 through 18, and mixtures thereof, and producing a sweet gas stream and an aqueous admixture containing crystalline sulfur and a reduced reactant;
   (b) removing at least a portion of the crystalline sulfur from the aqueous mixture;
   (c) regenerating the aqueous admixture in a regeneration zone with oxygen to produce an aqueous reaction mixture containing a regenerated reactant;
   (d) returning aqueous reaction mixture from the regeneration zone to the contacting zone.

2. The method of claim 1 wherein the stream from which the $H_2S$ and $CO_2$ are removed is selected from naturally-occurring gases, synthesis gases, process gases and fuel gases.

3. The method of claim 1 wherein the sour gaseous stream is selected from natural gas, a stream derived from the gasification of coal, or a hydrocarbon stream, and n is a whole number from 4 through 12.

4. The process of claim 3 wherein the reactant is the Fe(III) chelate of nitrilotriacetic acid.

5. The process of claim 4 wherein the modifier is selected from t-butanol, n-pentanol, n-octanol, n-decanol, n-undecanol, n-dodecanol, and mixtures thereof.

6. The process of claim 4 wherein the modifier is n-decanol.

7. A process for the removal of $H_2S$ from a sour gaseous stream comprising:
   (a) contacting the sour gaseous stream in a contacting zone with an aqueous reactant mixture at a temperature below the melting point of sulfur, the mixture comprising an oxidizing polyvalent metal chelate compound and less than 6 percent by weight, based on the weight of the aqueous reactant mixture, of a modifier selected from compounds having the formula $C_nH_{2n+1}OH$, wherein n is a number from 4 through 18, and mixtures thereof, and producing a sweet gas stream and an aqueous admixture containing crystalline-sulfur and a reduced reactant;
   (b) regenerating the aqueous admixture in a regeneration zone with oxygen to produce an aqueous reaction mixture containing a regenerated reactant;
   (c) removing at least a portion of the crystalline sulfur from the aqueous reaction admixture;
   (d) returning aqueous reaction mixture from step (c) to the contacting zone.

8. The method of claim 7 wherein the stream from which the $H_2S$ and $CO_2$ are removed is selected from naturally-occurring gases, synthesis gases, process gases and fuel gases.

9. The method of claim 7 wherein the sour gaseous stream is selected from natural gas, a stream derived from the gasification of coal, or a hydrocarbon stream, and n is a whole number from 4 through 12.

10. The process of claim 9 wherein the reactant is the Fe(III) chelate of nitrilotriacetic acid.

11. The process of claim 10 wherein the modifier is selected from t-butanol, n-pentanol, n-octanol, n-decanol, n-undecanol, n-dodecanol, and mixtures thereof.

12. The process of claim 10 wherein the modifier is n-decanol.

13. A process for the removal of H$_2$S and CO$_2$ from a sour gaseous stream comprising:
  (a) contacting the sour gaseous stream in a contacting zone at a temperature below the melting point of sulfur with a lean CO$_2$-selective liquid absorbent mixture containing an effective amount of an oxidizing polyvalent metal chelate compound and less than 6 percent by weight, based on the weight of the lean CO$_2$-selective absorbent mixture, of a modifier selected from compounds having the formula C$_n$H$_{2n+1}$OH, wherein n is a number from 4 through 18, and mixtures thereof, and producing a sweet gaseous stream and an absorbent admixture containing absorbed CO$_2$, crystalline sulfur, and reduced reactant;
  (b) removing at least a portion of the crystalline sulfur from the absorbent admixture, and leaving a solution containing absorbed CO$_2$ and reduced reactant;
  (c) stripping the solution containing absorbed CO$_2$ and said reduced reactant to remove CO$_2$ and regenerating said solution with oxygen to produce a lean CO$_2$-selective liquid absorbent mixture containing regenerated reactant, and
  (d) returning lean CO$_2$-selective liquid absorbent mixture containing regenerated reactant to the contacting zone.

14. The method of claim 13 wherein the stream from which the H$_2$S and CO$_2$ are removed is selected from naturally-occurring gases, synthesis gases, process gases and fuel gases.

15. The method of claim 13 wherein the sour gaseous stream is selected from natural gas, a stream derived from the gasification of coal, or a hydrocarbon stream, and n is a whole number from 4 through 12.

16. The process of claim 15 wherein the reactant is the Fe(III) chelate of nitrilotiacetic acid.

17. The process of claim 16 wherein the modifier is selected from t-butanol, n-pentanol, n-octanol, n-decanol, n-undecanol, n-dodecanol, and mixtures thereof.

18. The process of claim 16 wherein the modifier is n-decanol.

19. A process for the removal of H$_2$S and CO$_2$ from a sour gaseous stream comprising:
  (a) contacting the sour gaseous stream in a contacting zone at a temperature below the melting point of sulfur with a lean CO$_2$-selective liquid absorbent mixture containing an effective amount of an oxidizing polyvalent metal chelate compound and less than 6 percent by weight, based on the weight of the lean CO$_2$-selective absorbent mixture, of a modifier selected from compounds having the formula C$_n$H$_{2n+1}$OH, wherein n is a number from 4 through 18, and mixtures thereof, and producing a sweet gaseous stream and an absorbent mixture containing absorbed CO$_2$, crystalline sulfur, and reduced reactant;
  (b) stripping the solution containing absorbed CO$_2$, crystalline sulfur, and said reduced reactant and regenerating said solution with oxygen and producing a lean CO$_2$-selective absorbent mixture containing a regenerated reactant and sulfur,
  (c) removing sulfur from the lean CO$_2$-selective absorbent mixture containing the sulfur and the regenerated reactant, and leaving a lean CO$_2$-selective liquid absorbent mixture containing regenerated reactant, and
  (d) returning the CO$_2$-selective liquid absorbent mixture containing regenerated reactant to the contacting zone.

20. The method of claim 19 wherein the stream from which the H$_2$S and CO$_2$ are removed is selected from naturally-occuring gases, synthesis gases, process gases and fuel gases.

21. The method of claim 19 wherein the sour gaseous stream is selected from natural gas, a stream derived from the gasification of coal, or a hydrocarbon stream, and n is a whole number from 4 through 12.

22. The process of claim 21 wherein the reactant is the Fe(III) chelate of nitrilotriacetic acid.

23. The process of claim 22 wherein the modifier is selected from t-butanol, n-pentanol, n-octanol, n-decanol, n-undecanol, n-dodecanol, and mixtures thereof.

24. The process of claim 22 wherein the modifier is n-decanol.

25. A process for the removal of H$_2$S and CO$_2$ from a sour gaseous stream comprising:
  (a) contacting the sour gaseous stream in a contacting zone at a temperature below the melting point of sulfur with a lean CO$_2$-selective liquid absorbent mixture containing an effective amount of an oxidizing polyvalent metal chelate compound and less than 6 percent by weight, based on the weight of the lean CO$_2$-selective absorbent mixture, of a modifier selected from compounds having the formula C$_n$H$_{2n+1}$OH, wherein n is a number from 4 through 18, and mixtures thereof, and producing a sweet gaseous stream and an absorbent admixture containing absorbed CO$_2$, crystalline sulfur, and reduced reactant;
  (b) removing at least a portion of the crystalline sulfur from the absorbent admixture, and leaving a solution containing absorbed CO$_2$ and reduced reactant;
  (c) stripping the solution containing absorbed CO$_2$ and said reduced reactant to remove CO$_2$, and then regenerating said solution with oxygen to produce a lean CO$_2$-selective liquid absorbent mixture containing regenerated reactant, and
  (d) returning lean CO$_2$-selective liquid absorbent mixture containing regenerated reactant to the contacting zone.

26. The method of claim 25 wherein the stream from which the H$_2$S and CO$_2$ are removed is selected from naturally-occurring gases, synthesis gases, process gases and fuel gases.

27. The method of claim 25 wherein the sour gaseous stream is a stream derived from the gasification of coal, and n is a whole number from 4 through 12.

28. The process of claim 26 wherein the reactant is the FE(III) chelate of nitrilotriacetic acid.

29. The process of claim 28 wherein the modifier is selected from t-butanol, n-pentanol, n-octanol, n-decanol, n-undecanol, n-dodecanol, and mixtures thereof.

30. The process of claim 29 wherein the modifier is n-decanol.

31. A process for the removal of H$_2$S and CO$_2$ from a sour gaseous stream comprising:
  (a) contacting the sour gaseous stream in a contacting zone at a temperature below the melting point of sulfur with a lean CO$_2$-selective liquid absorbent mixture containing an effective amount of an oxidizing polyvalent metal chelate compound and less than 6 percent by weight, based on the weight of the lean $CO_2$-selective absorbent mixture, of a modifier selected from compounds having the formula $C_nH_{2n+1}OH$, wherein n is a number from 4 through 18, and mixtures thereof, and producing a sweet gaseous stream and an absorbent mixture containing absorbed $CO_2$, crystalline sulfur, and reduced reactant;

(b) stripping the solution containing absorbed $CO_2$, crystalline sulfur, and said reduced reactant, and then regenerating said solution with oxygen and producing a lean $CO_2$-selective absorbent mixture containing a regenerated reactant and sulfur.

(c) removing sulfur from the lean $CO_2$-selective absorbent mixture containing the sulfur and the regenerated reactant, and leaving a lean $CO_2$-selective liquid absorbent mixture containing regenerated reactant, and (d) returning the $CO_2$-selective liquid absorbent mixture containing regenerated reactant to the contacting zone.

32. The method of claim 31 wherein the stream from which the $H_2S$ and $CO_2$ are removed is selected from naturally-occurring gases, synthesis gases, process gases and fuel gases.

33. The method of claim 31 wherein the sour gaseous stream is a stream derived from the gasification of coal, and n is a whole number from 4 through 12.

34. The process of claim 33 wherein the reactant is the Fe(III) chelate of nitrilotriacetic acid.

35. The process of claim 34 wherein the modifier is selected from t-butanol, n-pentanol, n-octanol, n-decanol, n-undecanol, n-dodecanol, and mixtures thereof.

36. The process of claim 35 wherein the modifier is n-decanol.

37. The process of claims 1 through 12 wherein the modifier is present in an amount of from about 0.01 percent to about 4 percent by weight, based on the weight of the aqueous reactant mixture.

38. The process of claims 13 through 36 wherein the modifier is present in an amount of from about 0.01 percent to about 4 percent by weight, based on the weight of the $CO_2$-selective absorbent mixture.

39. The process of claims 1 through 12 wherein the modifier is present in an amount of from about 0.01 percent, by weight, based on the weight of the aqueous reactant mixture, to an amount which is at or near the saturation level of the modifier in the reaction solution without forming a significant second phase.

* * * * *